Aug. 4, 1925. 1,548,418
G. D. GRIFFICE
CULTIVATOR ATTACHMENT
Filed July 10, 1924
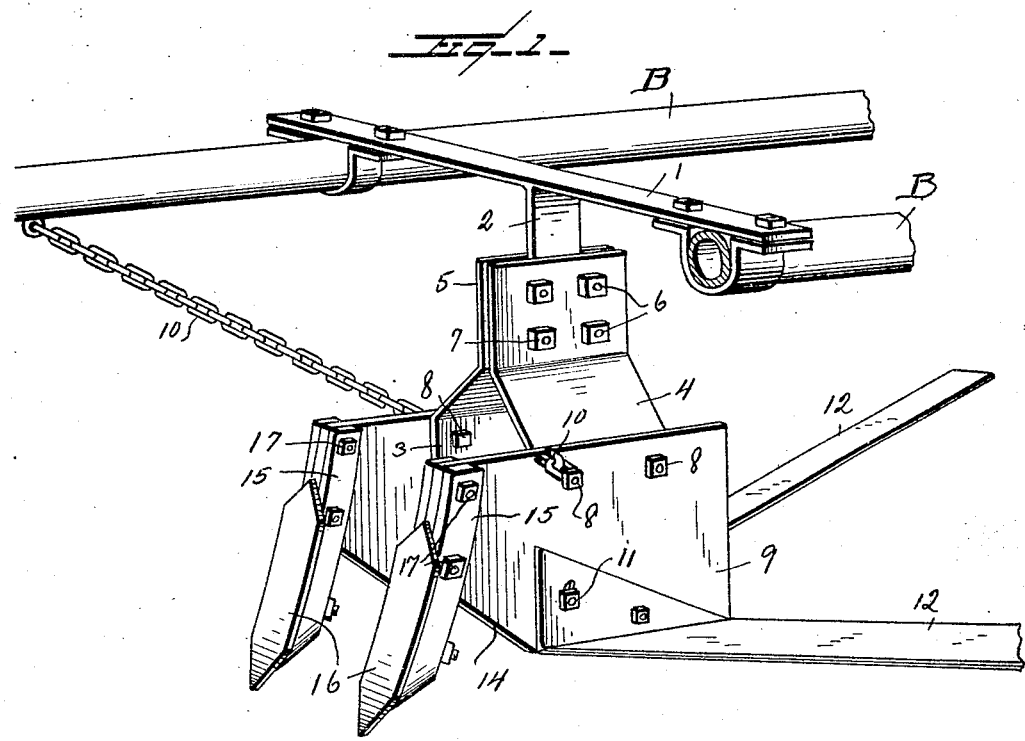
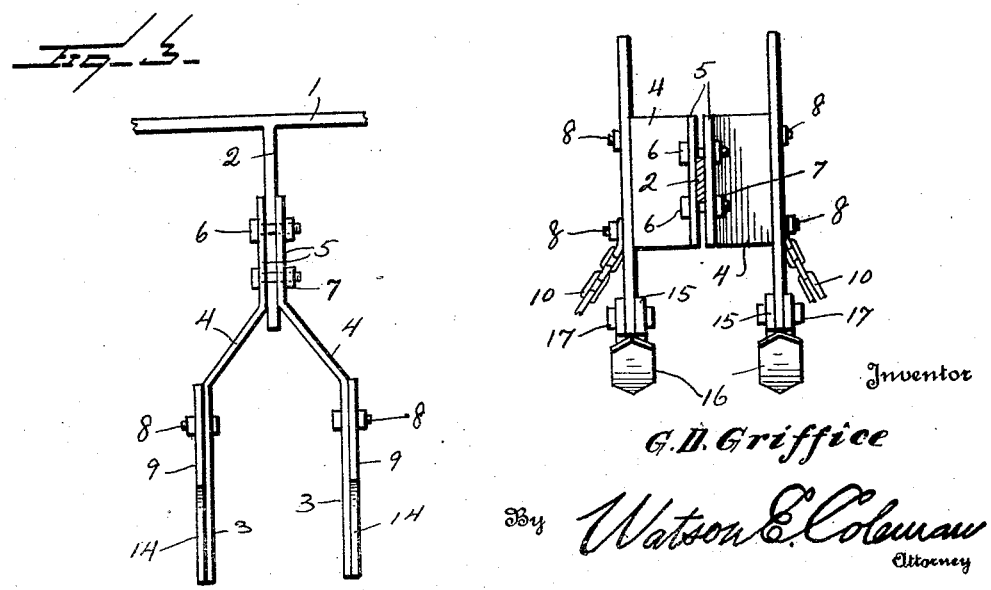
Inventor
G. D. Griffice
By Watson E. Coleman
Attorney Patented Aug. 4, 1925.

1,548,418

UNITED STATES PATENT OFFICE.

GEORGE D. GRIFFICE, OF BIG SPRING, TEXAS.

CULTIVATOR ATTACHMENT.

Application filed July 10, 1924. Serial No. 725,240.

*To all whom it may concern:*

Be it known that I, GEORGE D. GRIFFICE, a citizen of the United States, residing at Big Spring, in the county of Howard and State of Texas, have invented certain new and useful Improvements in Cultivator Attachments, of which the following is a specification, reference being had to the accompanying drawings.

This invention relates to certain improvements in cultivator attachments and it is an object of the invention to provide a device of this general character especially designed and adapted for use as a weed destroyer and to cultivate the ground closely adjacent small or young growing plants.

Another object of the invention is to provide an attachment of this general character having novel and improved means whereby the same may be readily supported from the beams of a cultivator and in a manner whereby the attachment will readily respond to the lateral or "wiggling" movement of the cultivator as may occur.

Furthermore, it is an object of the invention to provide a novel and improved attachment of this kind comprising plates adapted to travel at opposite sides of a plant row and wherein the forward end portions of said plates are provided with cultivating plows.

The invention consists in the details of construction and in the combination and arrangement of the several parts of my improved cultivator attachment whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein :—

Figure 1 is a view in perspective illustrating an attachment constructed in accordance with an embodiment of my invention, the coacting beams of a cultivator being shown in fragment;

Figure 2 is a view partly in top plan and partly in section of my improved attachment as herein disclosed;

Figure 3 is a fragmentary view in elevation of my attachment as herein set forth.

As disclosed in the accompanying drawings, B denotes the beams of a cultivator of an ordinary type and bridging the space between said beams and supported thereby is an elongated member 1. This member 1 substantially at its longitudinal center or at a point substantially midway between the beams B is provided with a depending arm 2.

The strips 3 adapted to be positioned at opposite sides of a plant row have their intermediate portions 4 disposed inwardly on a predetermined incline and terminating in the closely adjacent parallel portions 5. The arm 2 extends between the upper portions and which portions are held or clamped to the arm 2 by the bolts 6 arranged in pairs at opposite sides of said arm and having associated therewith the nuts 7. In addition to effectively maintaining the strips 3 in applied position with respect to the member 1 such connection permits the strips 3 to be adjusted lengthwise of the arm 2 as the requirements of practice may prefer.

Bolted, as at 8, to the lower portions of the strips 3 are the plates 1 extending fore and aft thereof said plates serving as guards. The forward bolts 8 have operatively engaged therewith the chains 10, each of said chains being suitably secured to an adjacent beam B at a predetermined point in advance of the member 1. These chains or members 10 provide means whereby draft is applied directly to the lower portion of the attachment so that the functioning thereof is materially facilitated.

The plates 9 serve as guards or fenders and said plates have secured thereto, as at 11, the rearwardly disposed elongated scraper blades 12 in divergent relation and which in practice serve effectually to destroy the weeds or the like between adjacent plant rows.

The forward portion of each of the plates 9 has its lower edge disposed upwardly, as at 14, on a predetermined incline and secured to the forward upper portion of said plate is the standard 15 for a cultivator plow or shoe 16. The standard 15 comprises spaced members between which the forward portion of the plate 9 is disposed and directed through said spaced members of the standard 15 and said interposed portion of the plate 9 are the holding bolts 17. The plows or shoes 16 operate effectively to cultivate the soil immediately adjacent to the plant row at the time the attachment is in use to destroy weeds or the like and which is of especial advantage when the attachment is employed in connection with small or young plants. The upwardly disposed edges 14 of the plates 9 provide immediately to the rear of the plows or shoes 16 openings which operate to prevent the accumulation of trash or the like which would otherwise tamper or interfere with the efficient operation of the attachment.

From the foregoing description it is thought to be obvious that a cultivator attachment constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

A device of the class described comprising, in combination, an arm, means for attaching the same to a cultivator or the like with said arm downwardly disposed, strips adapted to be positioned at opposite sides of a plant row, means for securing said strips to the arm, plates secured to said strips, and plows secured to the forward end portions of the plates, the forward portion of each of the plates having its lower edge upwardly inclined, said inclined edges of the plates providing openings immediately to the rear of the plows to prevent accumulation.

In testimony whereof I hereunto affix my signature.

G. D. GRIFFICE.